June 30, 1964 | E. H. REINSCHMIDT, JR | 3,139,519

PUNCHED CARD READER

Filed Nov. 15, 1960 | 3 Sheets-Sheet 1

INVENTOR.
EDWARD H. REINSCHMIDT, JR.
BY Darby + Darby
ATTORNEYS

PUNCHED CARD READER

Filed Nov. 15, 1960 3 Sheets-Sheet 2

INVENTOR.
EDWARD H. REINSCHMIDT, JR.
BY
Darby & Darby
ATTORNEYS

INVENTOR.
EDWARD H. REINSCHMIDT, JR
BY Darby & Darby
ATTORNEYS

United States Patent Office 3,139,519
Patented June 30, 1964

3,139,519
PUNCHED CARD READER

Edward H. Reinschmidt, Jr., Cincinnati, Ohio, assignor to Avco Corporation, Cincinnati, Ohio, a corporation of Ohio Filed Nov. 15, 1960, Ser. No. 69,474
4 Claims. (Cl. 235—61.11)

This invention relates to punched card readers of the type adapted for use with data processing equipment and the like.

Punched card readers are generally employed to "read out" information stored on punched cards by sensing the presence or absence of punches at predetermined locations on the cards. The information read out of the cards is then supplied, usually in the form of electric signals, to computer systems, or, in some applications, directly to control systems for performing one or more specified functions. In general, punched card readers may be divided into readers of the "scanning" type and readers of the "instantaneous read out" type. The scanning type of reader operates by causing relative movement between the card and a plurality of sensing means, such as a set of brush contacts, for example, so that the entire surface of the card is "scanned" by the set of contacts. This method of reading out punched cards is not only time consuming but also greatly increases the cost and structural complication of the punched card reader. The instantaneous read out type of punched card reader operates by positioning a punched card in a slot and sensing the entire surface of the card with a plurality of card reader contacts in a single, non-scanning operation.

The instantaneous read out method imposes the requirement that the punched card be very accurately positioned in the slot, so that correct read out information is obtained. Proper card positioning in the slot of the reader requires that the card be inserted to the proper depth within the slot and also that the card be properly oriented within the slot. The orientation aspect of the card positioning problem is necessary to insure that a card inserted to the proper depth in the slot is not reversed, so that the card reader contacts are always aligned with the predetermined locations on the card that they are intended to sense, to thereby supply correct read out information. It is also desirable that a punched card reader provide means for preventing premature withdrawal of a card inserted in the slot of the reader. Premature withdrawal of a card may occur when a card is withdrawn from the reader slot before the information stored on the card is read out to the equipment associated with the reader.

Accordingly, it is an object of this invention to provide a punched card reader of relatively simple and inexpensive construction which provides instantaneous read out of the information stored on the cards.

It is a further object of this invention to provide a punched card reader of the instantaneous read out type wherein means are provided for insuring that the cards are properly positioned in the slot of the reader.

It is a still further object of this invention to provide a punched card reader wherein means are provided for automatically ejecting punched cards which are improperly positioned in the reader slot.

It is an additional object of this invention to provide a punched card reader of a construction such that the slot of the reader is kept relatively free of dirt or lint which may cause malfunctioning of the reader.

It is another object of this invention to provide a punched card reader of the instantaneous read out type wherein means are provided for preventing premature withdrawal of punched cards from the reader slot.

It is still another object of this invention to provide a punched card reader having means for storing the information read out of a card, and wherein means are provided for automatically ejecting cards inserted before the stored information is cleared.

Briefly, the punched card reader of the invention employs mounting means including a toggle linkage for movably mounting a plurality of spring loaded card reader contacts relative to the reader slot, so that the contacts are adapted to be moved into card reading and non-reading positions. When the toggle linkage is closed, the card in the slot is held in place by the combined action of the toggle linkage and the spring loaded card reader contacts. Electromechanical transducer means, such as solenoid motor means, for example, are employed to open and close the toggle linkage, to thereby selectively move the contacts into card reading and non-reading positions. Depth and orientation limit switches are provided in the slot of the reader to control the operation of the transducer means in closing the toggle linkage, so that movement of the card reader contacts into reading position is controlled by the positioning of the card in the slot. When a card is not inserted in the slot to the proper depth and/or is not properly oriented in the slot, the punched card reader of the invention is prevented from reading the card, since the card reader contacts are not moved into reading position wherein the card is locked in place in the slot. Means are also provided for automatically ejecting improperly positioned cards, so that the operator of the punched card reader has an immediate indication that a card is mispositioned. The card ejecting means in its simplest form may be a simple, spring-biasing arrangement for the actuating member of either or both of the depth and orientation switches, so that when a card is mispositioned in the slot, it is not locked in place by the movement of the card reader contacts into reading position, but is instead ejected by the spring biasing action of the actuating members of the limit switches. In order to prevent premature wthdrawal of a punched card from the slot of the reader, means, such as a plurality of registry relays, may be provided in electric sensing circuits associated with the card reader contacts for preventing the motor means from opening the toggle linkage to unlock the card in the slot until the information is read out of the card. The registry relays may also be provided with holding circuits, so that they function as storage means to store the information read out until it is ready to be received by the computer or other means associated with the reader. Finally, means are provided for preventing the motor means from closing the toggle linkage for a newly inserted card until the information stored in the registry relays from a previously inserted punched card is cleared. The clearing of the reigstry relays may be accomplished by breaking their holding circuits upon signal from the computer or other means associated with the punched card reader, so that information read out from a series of successively inserted cards is supplied at a rate corresponding to the capacity of the computer to digest it.

In the drawings:

FIG. 3 is a sectional view taken along the line 3—3 of FIG. 1;

FIG. 4 is a sectional view taken along the line 4—4 of FIG. 3;

FIG. 5 is a fragmentary view on an enlarged scale of a portion of FIG. 4 showing the detailed construction of the card reader contacts;

FIG. 6 is a sectional view taken along the line 6—6 of

Figures 3, 4, 5, 6:
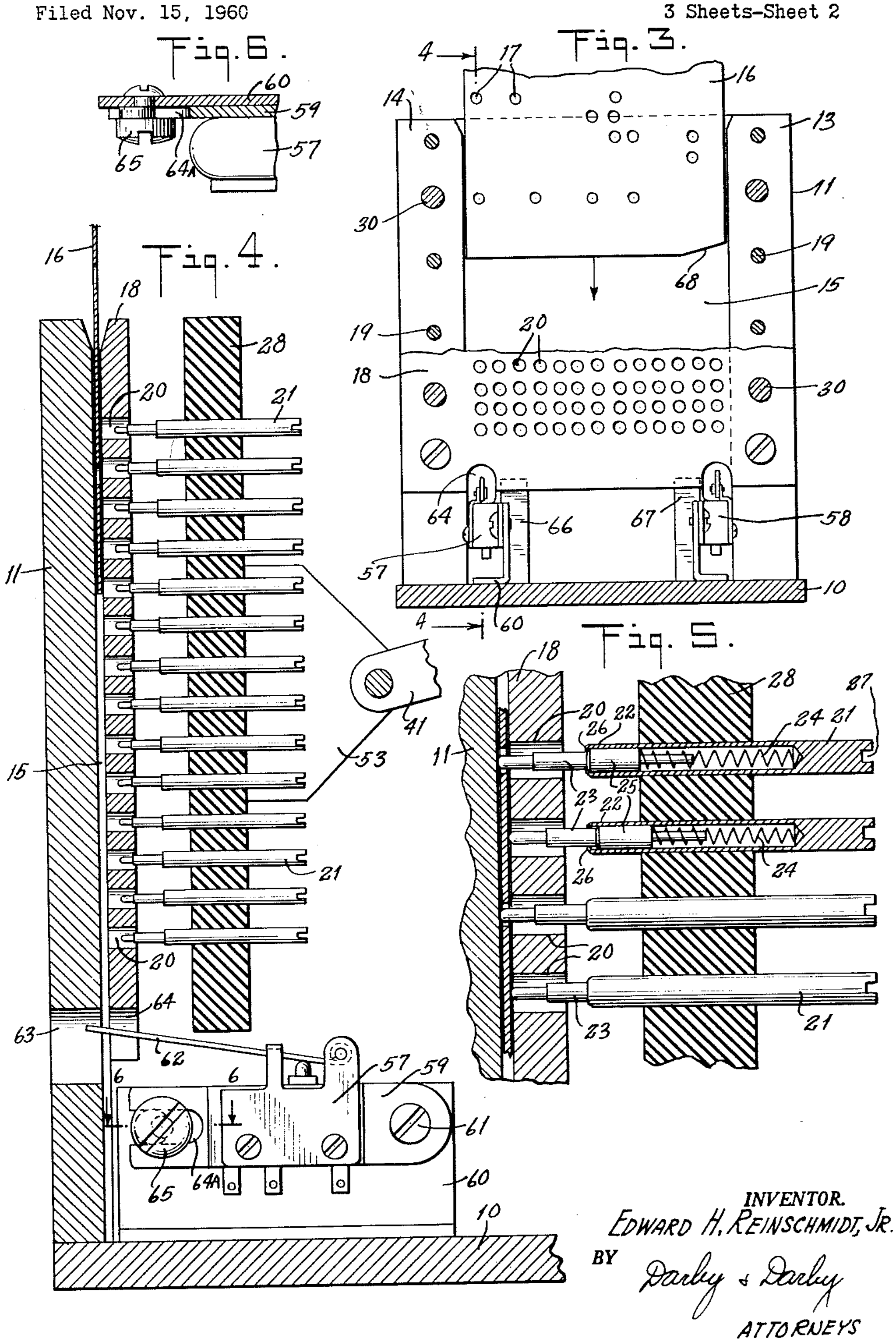
Figure 7:
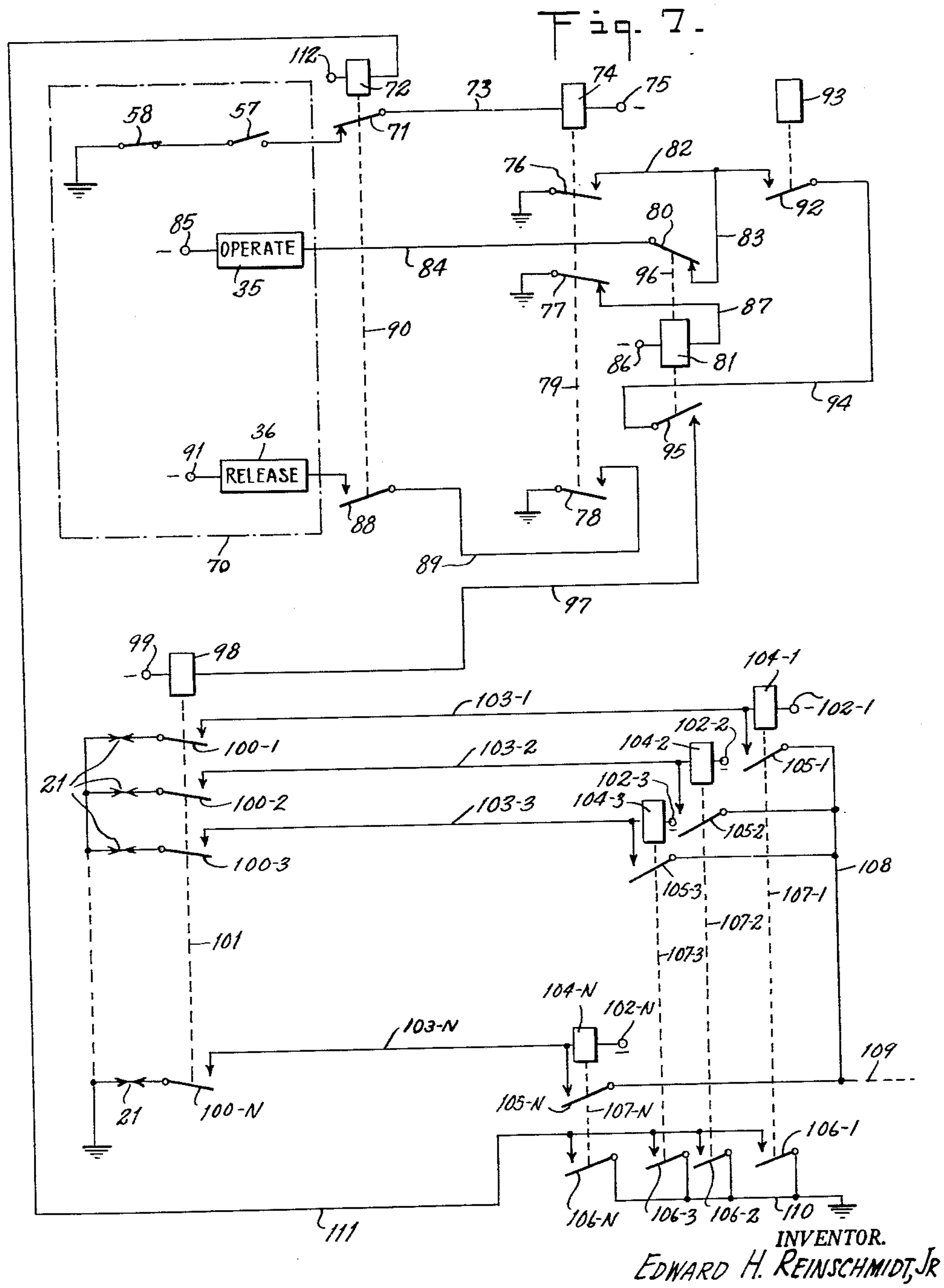

FIG. 4 showing the details of the eccentric mounting arrangement for the depth switch; and FIG. 7 is a schematic circuit diagram of the electric operating circuit for the punched card reader of FIGS. 1–6.

Figure 1:
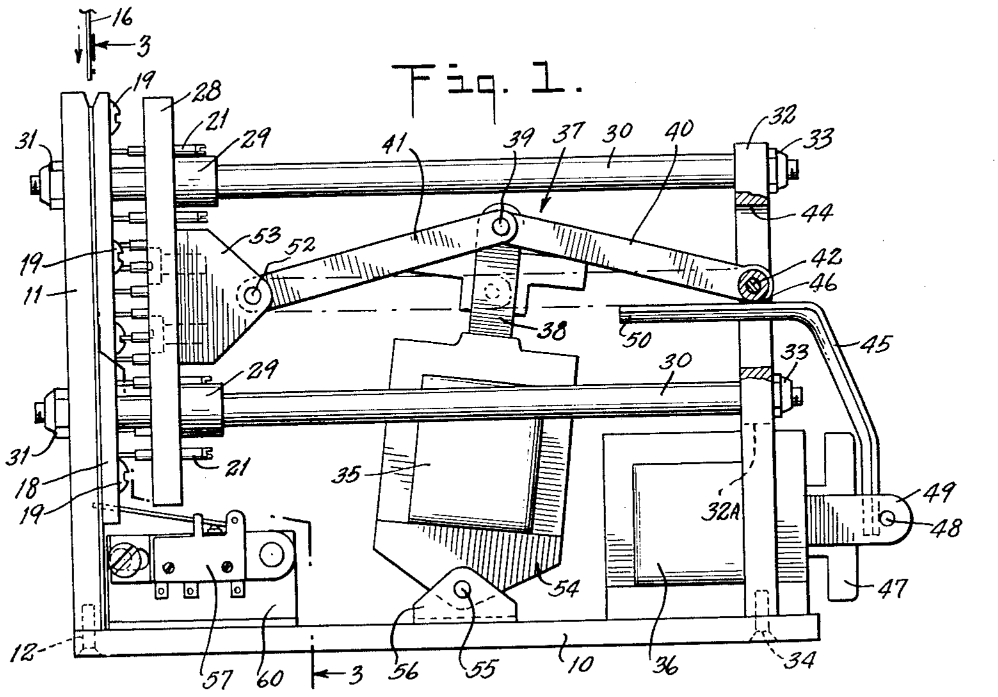
FIG. 1 is a side elevational view, partially in section, of a punched card reader constructed in accordance with the teachings of the invention.
Figure 2:
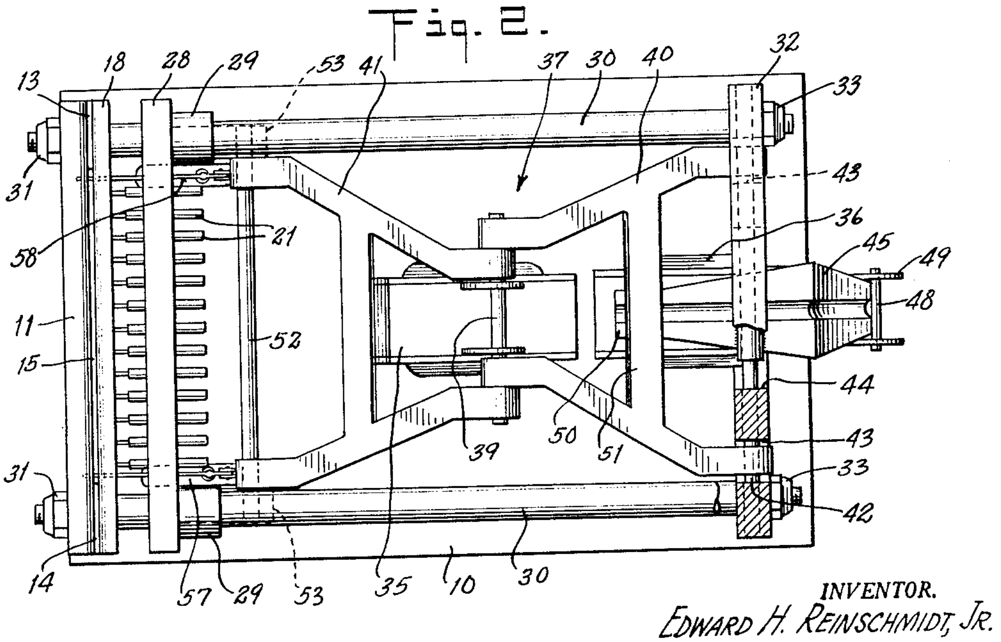
FIG. 2 is a plan view, partially in section, of the punched card reader of FIG. 1.

Referring now to FIGS. 1 and 2 of the drawings, the punched card reader of the invention is shown as comprising a base plate 10 having a platen 11 substantially perpendicularly mounted on one end thereof by any convenient means, such as the screws 12 illustrated. The platen 11 is formed with a pair of parallel shoulders 13 and 14 which serve to define a recessed portion or slot 15 adapted to receive a substantially rectangular punched card 16. The punched card 16 is provided with the usual openings or punches 17 selectively arranged in rows and columns to provide a source of stored information or data. A guide plate 18 formed of an electrical insulating material is secured to the shoulders 13 and 14 of the platen by means of screws 19 to close the slot. As seen in FIGS. 3, 4 and 5 of the drawings, the guide plate 18 is provided with a plurality of openings 20 arranged in rows and columns corresponding to the punches in the card and adapted to receive a plurality of card reader contacts 21. Each of the card reader contacts 21 comprises a cylindrical casing 22, a contact rod or "finger" 23 and a helical spring 24. The finger 23 is telescopically disposed within the casing 22 and is formed with a raised shoulder portion 25 which engages one end of spring 24, the other end of the spring being seated in the closed end of the cylindrical casing. The casing 22 is crimped at its open end 26 to engage the raised shoulder 25 and thereby limit outward axial movement of the finger 23 under the action of the spring 24. By virtue of this arrangement, the fingers 23 of the card reader contacts project outwardly from the casings 22 a fixed distance under the action of springs 24, but are adapted to be moved inwardly against the force of the springs upon the application of an external axial force. In practice, the card reader contacts are spring loaded to exert between 75 and 100 grams of pressure when axially depressed 1/16 of an inch. The closed ends of the casings 22 of the contacts are provided with means, such as slots 27 illustrated, for connecting each contact to an associated electrical sensing circuit.

The card reader contacts 21 are arranged in rows and columns corresponding to the openings 20 of the guide plate and fixedly mounted in a contact holder plate 28 formed of an electrical insulating material. Contact plate 28 is provided with four bearings 29 which may be "Oilite" bearings, for example, so that the contact plate is adapted to be slidably mounted on four guide rods 30 disposed substantially parallel to the base plate 10. One end of each of the guide rods 30 is formed with a threaded portion of reduced diameter and secured to the platen 11 by means of a nut 31, while the other end is similarly secured to an aligning plate 32 by means of a nut 33. The aligning plate 32 is perpendicularly mounted on base plate 10 by means such as the screws 34 illustrated, so that the four guide rods 30 are disposed substantially parallel to each other and to the plane of base plate 10. By virtue of this arrangement, contact plate 28 is adapted to slide along the guide rods in a direction substantially perpendicular to the plane of platen 11 in a manner which permits card reader contacts 21 to engage the slot 15 of the platen.

The mechanism for moving contact plate 28 may be seen in FIGS. 1 and 2 of the drawings as comprising an operate solenoid 35, a release solenoid 36 and a toggle linkage, indicated generally as 37. The movable armature 38 of the operate solenoid 35 is hingedly connected to the center pin 39 of the toggle linkage, so that the arms 40 and 41 of the linkage are adapted for rotational movement about the pin 39. The free ends of linkage arm 40 are pivotally mounted on the aligning plate 32 by means of a pin 42 rotatably mounted on the aligning plate, the aligning plate being suitably apertured at 43 to receive the ends of arm 40. An opening 44 is formed in the aligning plate 32 between the apertures 43 to receive a susbtantially "L-shaped" actuating link 45 which is fixedly secured to the pin 42 at a point 46 near the apex of the links, so that the link is adapted to be rotated about pin 42 in a plane perpendicular to the pin. As illustrated, the actuating link 45 may be a sheet metal part with a stiffening rib added for structural rigidity. The lower end of link 45 is pivotally connected to the armature 47 of release solenoid 36 by means of a pin 48 and a pair of brackets 49 mounted on the armature. The release solenoid itself is secured to the base plate 10 by any convenient means and is located in an opening 32A formed in the lower portion of the aligning plate. By virtue of this arrangement, movement of armature 47 of release solenoid 36 causes the upper end 50 of the actuating link 45 to rotate about pin 42 and, in so doing, to bear against portion 51 of arm 40 of the toggle linkage to thereby open the linkage. The free ends of toggle linkage arm 41 are siimlarly pivotally connected to contact plate 28 by means of a pin 52 and a pair of brackets 53 secured to the plate.

As thus far described, it is believed apparent that contact holding plate 28 is adapted to be moved along guide rods 30 by the actuating solenoids 35 and 36, so that card reader contacts 21 may be moved into and out of card reading position with respect to slot 15 of the platen. When operating solenoid 35 is not energized and the toggle linkage is open, toggle linkage arms 40 and 41 are in the positions shown in solid line in FIG. 1 of the drawings, so that the card reader contacts 21 do not project into the slot 15. When operate solenoid 35 is energized, its armature 38 will be drawn in to cause pin 39 of the toggle linkage to move in a downward direction as viewed in FIG. 1. At the end of armature travel, the arms 40 and 41 will assume the positions shown in dotted line in FIG. 1, at which time, contact holding plate 28 will have moved closer to platen 11 so that card reader contacts 21 enter slot 15 and move into engagement with the outer wall of the slot. It may be noted that with the toggle linkage closed and the operate solenoid deenergized, a card in slot 15 is locked in place by the combined action of the spring loaded card reader contacts 21 and the linkage. Since the end of armature 38 of operate solenoid 35 describes a circular path about pin 42, the solenoid housing 54 is pivotally mounted on base plate 10 by means of a pin 55 and brackets 56 to permit the housing to be moved relative to the base plate. Release solenoid 36 is employed to open the toggle linkage 37 and move contact plate 28 away from platen 11, so that the card reader contacts 21 no longer project into slot 15. When solenoid 36 is energized, armature 47 is drawn in and acts to rotate actuating link 45 about pin 42 in a clockwise direction as viewed in FIG. 1 of the drawings. This movement causes end 50 of the link to bear upwardly against portion 51 of toggle linkage arm 40, so that the arms once more assume the solid line position shown in FIG. 1.

The punched card reader of the invention also makes provision for sensing and ejecting punched cards which are improperly positioned in the slot 15 of the reader. To this end, a depth switch 57 and an orientation switch 58 are provided at the bottom of slot 15. In practice, switches 57 and 58 may comprise limit switches of the type adapted to be actuated in response to extremely small forces and movements, such as a "Milli-switch," for example. As seen in FIGS. 1, 3, 4 and 6 of the drawings, depth switch 57 is mounted on a plate 59 which is pivotally secured at one end thereof to a bracket 60 by means of a screw 61. The bracket 60, which may be "L-shaped" as illustrated, is mounted on base plate 10 by any convenient means so that the actuating arm 62 of the switch extends into slot 15 adjacent one corner thereof. To permit movement of arm 62, platen 11 and guide plate 18 are respectively apertured at 63 and 64.

The other end of switch mounting plate 59 is formed with a slot 64A which coperates with an eccentric rivet 65 to provide a means for adjusting the vertical position of actuating arm 62 of the switch. As seen in FIG. 6 of the drawings, the eccentric rivet 65 is rotatably mounted on bracket 60, so that the eccentric shank portion of the rivet engages slot 64A of the switch mounting plate 59. By rotating eccentric rivet 65 with a screw driver or the like, the eccentric shank portion of the rivet bears against the slot 64A to rotate switch mounting plate 59 about mounting screw 61, to thereby raise or lower the end of actuating arm 62 in the slot 15 of the reader. As seen in FIG. 3, a card insertion stop 66 is mounted on platen 11 at the bottom of slot 15 adjacent depth switch 57 to engage the leading edge of a card inserted in the slot, to thereby limit card insertion to a predetermined depth. The position of depth switch 57 is then adjusted so that the leading edge of an inserted card moves the arm 62 to actuate the switch just as the leading edge of the card engages the card insertion stop. Accordingly, depth switch 57 is adapted to provide an indication of card insertion to the proper depth in slot 15 and may cooperate with an electrical circuit to be described hereinafter to automatically reject improperly inserted cards.

Inasmuch as the construction and mounting arrangement for orientation switch 58 are substantially the same as for depth switch 57, this switch will not be described in detail except to note that it is mounted at the bottom of slot 15 at the opposite corner thereof from depth switch 57. A card insertion stop 67 similar in construction to stop 66 is provided adjacent orientation switch 58 to serve as a positive stop for the leading edge of an inserted card. The function of orientation switch 58 is to sense whether or not a punched card has been properly oriented in the slot 15 to insure that the information stored on the card is properly supplied to equipment associated with the punched card reader. To this end, the punched card is provided with a distinguishing characteristic, such as the clipped corner 68 of the card shown in FIG. 3 of the drawings. By clipping only one corner of the card and by arranging the actuating arm of switch 58 in relation to card insertion stop 67 so that the switch will not be actuated by the clipped corner of the card, an indication is provided of whether or not a card is properly oriented within the slot 15 of the reader. Should the card 16, for example, be improperly inserted so that an unclipped corner of the card is brought to bear against stop 67, the orientation switch 58 will be actuated to provide an electrical indication of an improperly inserted card. By virtue of this arrangement, the switch 58 will be actuated for all card orientations except the one in which the clipped corner 68 of the card bears against stop 67. Although portions of the leading edge of the punched card other than the corner 68 could be cut away to provide the necessary distinguishing mark for card orientation, it is believed apparent that to avoid ambiguity in operation, the cut away portion of the leading edge must be spaced a distance from the center line of the card.

The electrical operating circuit for the mechanical portion of the punched card reader illustrated in FIGS. 1–6 of the drawings is shown schematically in FIG. 7, wherein the circuit components physically mounted on the mechanical portion of the reader are shown enclosed by block 70. In describing the operating circuit for the punched card reader of the invention, it will be assumed for purposes of illustration that the reader supplies information from the punched cards to an electronic computer which also receives information from a measuring device, such as a weighing scale, for example. As seen in FIG. 7, depth switch 57 and orientation switch 58 are serially connected between ground and one side of a contact 71 of a release relay 72. The other side of release relay contact 71 is connected by a lead 73 and the control winding of a start relay 74 to the negative terminal 75 of a source (not shown) of supply voltage, so that the start relay is adapted to be energized when switches 57 and 58 and release relay contact 71 are all closed. Start relay 74 is provided with contacts 76, 77 and 78 which are mechanically interconnected as indicated by the dashed line 79. Contact 76 is connected between ground and one side of a contact 80 of a slow release relay 81 by means of leads 82 and 83. The other side of slow release relay contact 80 is connected by a lead 84 and the control winding of operate solenoid 35 to the negative terminal 85 of a source (not shown) of supply voltage, so that the operating solenoid 35 is adapted to be energized when slow release relay contact 80 and start relay contact 76 are both closed. Contact 77 of start relay 74 is connected in series circuit with the control winding of slow release relay 81, between ground and the negative terminal 86 of a source (not shown) of supply voltage by means of a lead 87, so that the energization of slow release relay 81 is controlled by the position of contact 77. Contact 78 of start relay 74 is connected between ground and one side of a contact 88 of release relay 72 by means of lead 89, the dashed line 90 indicating the mechanical interconnection between release relay contacts 71 and 88. The other side of release relay contact 88 is connected through the control winding of release solenoid 36 to the negative terminal 91 of a source (not shown) of supply voltage, so that the energization of release solenoid 36 is controlled by start relay contact 78 and release relay contact 88.

The circuit junction between start relay contact 76 and slow release relay contact 80 is connected by means of a contact 92 of a measuring relay 93 and a lead 94 to one side of a contact 95 of slow release relay 81. The mechanical interconnection between contacts 80 and 95 of the slow release relay is indicated schematically by dashed line 96. The other side of slow release relay contact 95 is connected by lead 97 and the control winding of a reading relay 98 to the negative terminal 99 of a source (not shown) of supply voltage, so that the energization of the reading relay is controlled by slow release relay contact 95, measuring relay contact 92 and start relay contact 76. Reading relay 98 is provided with a plurality of contacts 100–1 through 100–N which are mechanically interconnected as illustrated schematically by the dashed line 101. Each of the reading relay contacts 100 is associated with a different one of the card reader contacts 21 and has one side thereof connected to ground through the card reader contact associated therewith. The other side of each reading relay contact 100 is connected to the negative terminal 102 of a supply voltage source (not shown) by means of a lead 103 and the control winding of a registry relay 104, so that the registry relay 104 is adapted to be energized upon the simultaneous closure of the reading relay contact 100 and the card reader contact 21 associated therewith. Each of the registry relays 104 is provided with contacts 105 and 106 which are mechanically interconnected as shown at 107. Contact 105 of each registry relay 104 is connected between the ground potential side of the control winding of each registry relay and ground through a circuit comprising lead 108, locking lead 109 and the electronic computer (not shown), so that a holding circuit is formed to keep each registry relay energized until released by the electronic computer. Registry relay contacts 106 are connected in parallel circuit between ground and one side of the control winding of release relay 72 by means of leads 110 and 111. The other side of the control winding of release relay 72 is connected to the negative terminal 112 of a source (not shown) of supply voltage, so that the energization of release relay 72 is independently controlled by each of the registry relay contacts 106.

In practice, release relay 72, start relay 74, slow release relay 81 and reading relay 98 may be of the well known "telephone type," for example. All of these relays, with the exception of the slow release relay 81, are normally not energized as illustrated in FIG. 7. Slow release relay 81 is normally energized and is of the type which releases or actuates its contacts a predetermined period of time after being deenergized. The measuring relay 93 is controlled by the measuring device, such as the aforementioned weighing scale, which also supplies data to the electronic computer. The relay 93 serves as an electrical interlock between the punched card reader and the weighing scale to coordinate the data supplied from these sources to the computer. For example, measuring relay 93 may be energized in response to the placing of weights on the weighing scale. The depth switch 57 is a normally open switch and is closed only when the punched card is inserted to the proper depth in the slot 15 of the card reader. Orientation switch 58 is a normally closed switch which is not opened unless the punched card is incorrectly oriented in the slot of the reader.

In order to describe the operation of the system shown in FIG. 7 of the drawings, it will be assumed that a punched card is inserted into the slot 15 of the reader. If the card is correctly oriented and inserted to the proper depth, depth switch 57 will close and orientation switch 58 will not be opened. This action completes the energizing circuit for start relay 74 so that it closes contact 76 to energize the operate solenoid 35 through a circuit comprising contact 76, leads 82 and 83, slow release relay contact 80 and lead 84. At this time, the contact plate 28 of the card reader unit is actuated by the toggle linkage 27 to move card reader contacts 21 into engagement with the punched card in the slot 15. The energization of start relay 74 also opens relay contact 77 which, in turn, deenergizes slow release relay 81, so that after a predetermined period of time, the slow release relay contact 80 opens to break the circuit to operate solenoid 35. Since the operate solenoid 35 has closed the toggle linkage to a position just beyond center, the punched card is effectively locked in the slot 15 by the pressure of the spring-loaded card reader contacts 21 against the unpunched portions of the card. The deenergization of slow release relay 81 also closes slow release relay contact 95 to partially complete the energizing circuit for reading relay 98. Since the opening of the energizing circuit for operate solenoid 35 by the slow release relay does not de-energize the circuit for start relay 74, start relay contact 76 still remains closed, so that when a signal is received from the measuring device, such as a weight placed on the scale, for example, scale relay 93 is energized to close scale relay contact 92 and thereby energize reading relay 98. It may be noted at this time that the energization of start relay 74 has also closed start relay contact 78, to thereby partially complete the energization circuit for release solenoid 36. When reading relay 98 is energized by the aforementioned action, contacts 100–1 through 100–N are closed to partially complete the energizing circuits for registry relays 104. Since the card reader contacts 21 are in series circuit with the contacts 100 of the reading relay, the registry relays 104 will be energized on a selective basis depending upon whether a particular registry relay is associated with a card reader contact 21 which has been closed. When the platen 11 of the card reader unit is connected to electrical ground, it is seen that if an unpunched portion of the card is adjacent a particular card reader contact 21, that the circuit for the registry relay 104 associated with that reader contact will not be completed. However, should a punched portion of the card be adjacent the particular card reader contact, the contact passes through the card and strikes the platen 11 to thereby complete the energizing circuit for the registry relay associated with that reader contact. Accordingly, the energization of registry relays 104 depends upon the particular configuration of the punches in the punched card inserted, so that the information stored in the card is read out. Those of the registry relays 104 which are energized close their contacts 105 to thereby complete a holding circuit through the electronic computer apparatus associated with the system. At the same time, the energization of selected ones of the registry relays closes the contacts 106 of those relays to complete the energizing circuit for release relay 72 through lead 111.

The energization of release relay 72 opens release relay contact 71 to thereby de-energize start relay 74. At the same time, release relay contact 88 is closed to energize the release solenoid 36 to move the card reader contacts 21 out of engagement with the punched card. Inasmuch as start relay 74 has been de-energized by the opening of release relay contact 71, start relay contact 78 is again returned to its open position, to thereby break the energizing circuit for the release solenoid. The action of de-energizing start relay 74 also closes start relay contact 77 to energize the slow release relay 81 in preparation for the insertion of the next punched card. At this time, the energization of slow release relay 81 opens slow release relay contact 95 in the energizing circuit for reading relay 98, to thereby open the reading relay contacts 100. Although the reading relay contacts 100 are opened, the previously energized registry relays 104 remain energized because their holding circuits including contacts 105 remain closed. This feature is extremely useful because it permits the information read out of a punched card to be stored in the registry relays even though the punched card has been withdrawn. Furthermore, since the registry relays 104 remain energized, their contacts 106 remain closed, so that release relay 72 is energized to keep release relay contact 71 opened, to thereby prevent the start relay 74 from being energized by the insertion of the next punched card. When the electronic computer has digested the information stored in the registry relays, the holding circuits for the registry relays are opened by the computer so that registry relay contacts 105 and 106 are opened. At this time, the energizing circuit for release relay 72 is opened, to thereby close release relay contact 71 and permit energization of the start relay 74 by the next punched card inserted. Should a punched card be inserted prematurely while information is still stored in the registry relays, the circuit for the operate solenoid 35 cannot be completed since start relay 74 cannot be energized. Therefore, the card is not locked in the slot 15 but is ejected by the spring biasing action of the actuating arms of depth switch 57 and orientation switch 58. Similarly, should a card be mispositioned in the slot, so that either or both of the switches 57 and 58 fail to complete the energizing circuit for start relay 74, the operate solenoid 35 is prevented from closing the toggle linkage to lock the card in the slot. Again, the spring biasing action of the actuating arms of the switches 57 and 58 serve to eject the card from the slot. If desired, of course, it is a simple matter to provide positive spring ejectment or even solenoid ejectment of prematurely inserted or mispositioned cards. Finally, when the weight on the scale is removed, the scale relay contact 92 is opened, so that even if a punched card is properly inserted in the slot and locked in place by the action of the operate solenoid 35, the information from the card will not be read out because the energizing circuit for reading relay 98 will be broken.

From the foregoing description it may be seen that the punched card reader of the invention provides a simplified arrangement for instantaneously reading punched cards without the necessity of "scanning" the cards. Furthermore, the novel arrangement of the depth and orientation switches prevents the card reader from responding to improperly inserted cards and provides an immediate indication of this condition to the operator of the device. Additionally, the above-described interlock between the registry relays and the operating circuits for the operate and release solenoids of the reader prevents the operator of the device from prematurely withdrawing an inserted card before the information stored on the card is read into storage in the registry relays. When the information read out is actually stored, the card may be withdrawn but a new card may not be read out until the stored information is cleared upon signal from the computer means. Finally the open construction of the slot 15 in the card reader device tends to prevent clogging of the equipment by lint or other particles, to thereby permit trouble-free operation and require little maintenance.

It is believed apparent that many changes could be made in the above-described punched card reader and many seemingly different embodiments of the invention constructed without departing from the scope thereof. For example, although the punched card reader is described in association with an electronic computer having a provision for receiving measured information, as well as stored information from the punched cards, it is obvious that the card reader could be employed with other types of computer systems or may even be employed in purely control systems. Additionally, it will be understood that the number and arrangement of the card reader contacts 21 could be varied to accommodate any of the different types of punched cards currently in use. Accordingly, it is intended that all matter contained in the above description or shown in the accompanying drawings shall be interpreted as illustrative and not in a limiting sense.

What is claimed is:

1. In a punched card reader, the combination comprising: normally disconnected circuit means for performing pre-selected functions; a horizontally disposed supporting base member; a vertically disposed electric conducting platen rigidly secured to said base member, said platen having a pair of spaced parallel shoulders defining a slot for receiving a rectangular card punched with a plurality of holes; a guide plate formed of electric insulating material secured to said platen between said pair of shoulders to close said slot, said guide plate having a plurality of openings arranged in a predetermined pattern, said holes in said card corresponding to certain of said openings in said guide plate; a plurality of guide rods horizontally rigidly supported from said base; a vertically disposed contact holder plate slidably supported on said guide rods; a plurality of electric conducting contacts projecting from said contact holder plate, said contacts being arranged in said predetermined pattern, each of said contacts including a rod member yieldably urged from said contact holder plate toward said platen; first selectively operable control means for moving said contact holder plate toward said platen whereby said rod members of said contacts extend through said openings in said guide plate and through said corresponding holes in said card positioned in said slot, whereby said rod members in positions corresponding to said holes in said card contact said electric conducting platen to connect said circuit means; second selectively operable control means for moving said contact holder away from said platen whereby said rod members are retracted from said openings in said guide plate; means responsive to the improper positioning of a card in said slot for inhibiting operation of said first control means to prevent movement of said contacts into card-reading positions for cards improperly positioned in the slot, said last-named means including first and second switch means mounted adjacent the lower end of said slot and adapted to be actuated by the leading edge of a card inserted in the slot, said switch means serving also to eject any improperly positioned card.

2. The invention as defined in claim 1 wherein said switch means are arranged to energize said control means to move said contacts into card-reading positions for cards inserted to a predetermined depth so that said switch means function as a depth switch to inhibit operation of said control means for cards inserted to an improper depth.

3. The invention as defined in claim 1 wherein said first selectively operable control means comprises an operate solenoid pivotally fixed to said base and having an armature movable upon energization; a toggle linkage having first and second arms connected by means of a pin, said armature also being connected to said pin, the other end of said first arm being pivotally connected to said contact holder plate and the other end of said second arm being pivotally fixed with respect to said base, whereby energization of said operate solenoid causes the rotation of said toggle linkage and the horizontal sliding movement of said contact holder plate.

4. The invention as defined in claim 3 wherein said second selectively operable control means for horizontally slidably moving said contact holder plate comprises a release solenoid fixed to said base and having an armature; a link connected at one end to said armature and at the other end to said second arm of said toggle, whereby movement of said release solenoid armature causes rotation of said second arm to slidably move said contact holder plate away from said platen and retract said contacts from said openings.

References Cited in the file of this patent

UNITED STATES PATENTS

| | | |
|---|---|---|
| 1,991,729 | Brougham | Feb. 19, 1935 |
| 2,877,081 | Dodge et al. | Mar. 10, 1959 |
| 2,889,984 | Gruver | June 9, 1959 |
| 2,890,828 | Stark et al. | June 16, 1959 |